Aug. 10, 1954     J. W. GRAY     2,686,264
CALIBRATOR

Filed Jan. 15, 1946     2 Sheets-Sheet 1

INVENTOR
JOHN W. GRAY
BY *M. O. Hayes*
ATTORNEY

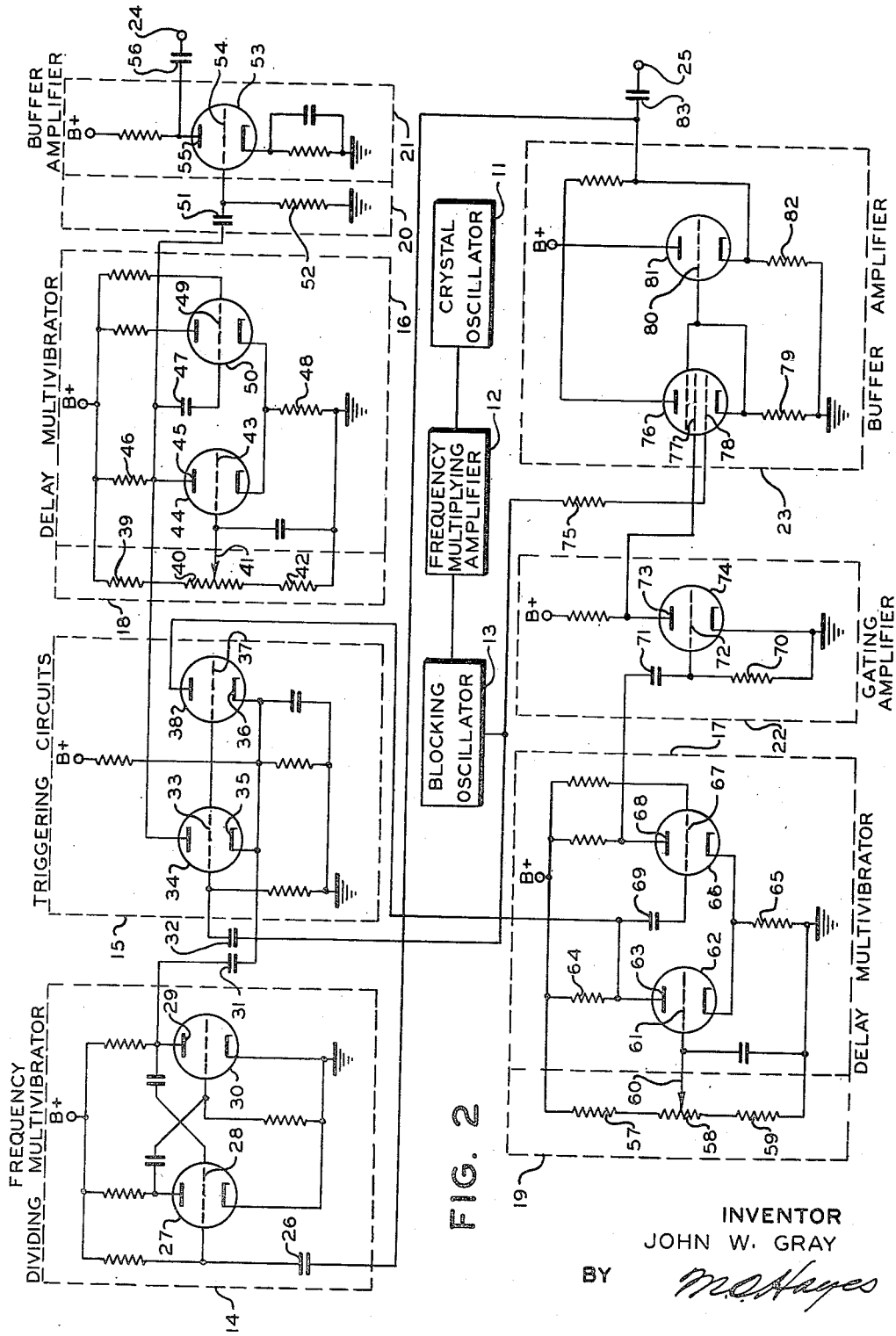

Patented Aug. 10, 1954

2,686,264

UNITED STATES PATENT OFFICE 2,686,264

CALIBRATOR

John W. Gray, Cambridge, Mass., assignor, by mesne assignments, to the United States of America as represented by the Secretary of the Navy Application January 15, 1946, Serial No. 641,344

7 Claims. (Cl. 250—27)

This invention relates broadly to calibrators and more specifically to ultra high frequency electronic precision pulse generators as calibrators for electronic equipment.

Accurate timing and calibration is a prime requisite of many types of electronic equipment, particularly those developed in the recent or present art. An example, for instance, is low altitude bombing radar equipment which permits bombing of a target from an airplane regardless of visibility conditions between the airplane and the target. In one type of this equipment, a pip appearing as a marker on a cathode ray tube screen is caused to move in range thereon at a constant rate so as to continually coincide with the approaching target. This rate is controllable by hand and the associated control device is calibrated in order that the relative plane-target speed may be read. From the relative plane-target speed and the known altitude of the airplane, the correct bomb release slant range may be ascertained and set on a calibrated precision delay multivibrator. When the marker pip moves in to this range it will coincide with the tail end of a pulse produced by the multivibrator and the coincidence so produced will act to operate the bomb release relay. It is obvious that, for accurate results of this equipment, precise calibration is required for both the control device reading relative plane-target speed and the precision delay multivibrator.

One of the objects of the invention is to provide an ultra high frequency calibrator for the generation of a series of regularly spaced calibration pulses of voltage at a known and desired repetition frequency.

Another object of the invention is to provide an ultra high frequency calibrator for the generation of a series of regularly spaced calibration pulses of voltage at a known and desired repetition frequency, and a series of regularly spaced reference pulses of voltage at a known and desired submultiple of the calibration pulse repetition frequency.

Still another object of the invention is to provide an ultra high frequency calibrator for the generation of a series of regularly spaced calibration pulses of voltage at a known and desired repetition frequency, and a series of regularly spaced reference pulses of voltage at a submultiple of the calibration pulse repetition frequency whose phase relationship with the series of calibration pulses may be controlled as desired, and a means for excluding a known and desired number of calibration pulses after each reference pulse.

These and other objects of the invention will be more apparent to those skilled in the art from a consideration of the following detailed description when taken together with the accompanying drawings in which:

Fig. 2 represents in partially circuit schematic and block diagram form the embodiment of Fig. 1.

Figure 1:
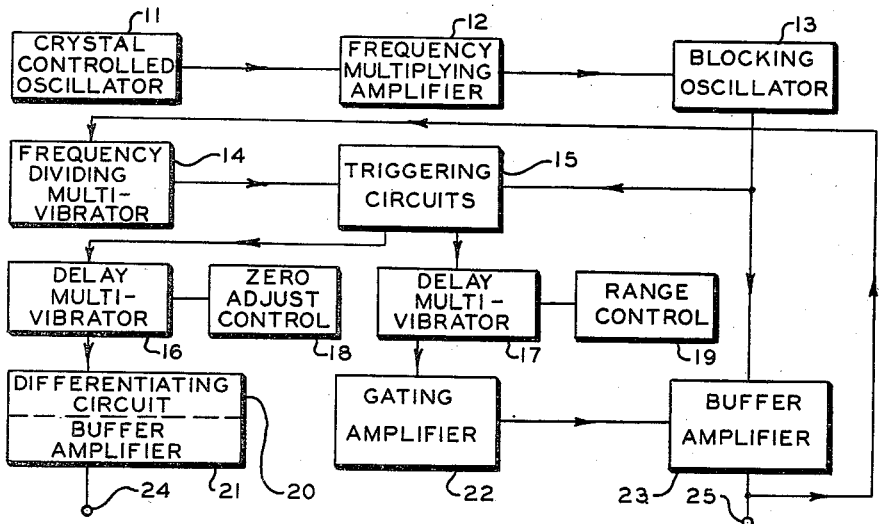
Fig. 1 represents in block diagram form one embodiment of this invention.

Referring now to Fig. 1, one embodiment of the invention is shown in block diagram form wherein there will be produced at terminal 25 a series of regularly spaced calibration pulses of voltage at a known and desired repetition frequency, and at terminal 24 a series of regularly spaced reference pulses of voltage at a known and desired repetition frequency which is a submutiple of the desired calibration pulse repetition frequency. A zero adjustment control 18 is provided by which the phase relationship of the series of reference pulses to the series of calibration pulses may be adjusted as desired. A range control 19 is also provided by which a known and desired number of calibration pulses first produced after each reference pulse may be excluded.

The frequency determining component of the embodiment of Fig. 1 is a crystal controlled oscillator 11 which is designed for stable generation of a frequency which is a submultiple of the desired calibration pulse repetition frequency. The frequency generated by oscillator 11 is coupled to a frequency multiplying amplifier 12 which is tuned to a multiple harmonic thereof, producing in its output a frequency which is equal to the desired calibration pulse repetition frequency. The output from amplifier 12 is coupled to a blocking oscillator 13 which is synchronized thereby to produce in its output a series of pulses at the calibration pulse repetition frequency. The output of blocking oscillator 13 is coupled through a buffer amplifier 23, which is gated as will be later described, to terminal 25, there appearing at a series of calibrating pulses of voltage at the desired repetition frequency.

The calibration pulses produced at terminal 25 are also coupled to a free-running frequency dividing multivibrator 14, synchronizing it to operate at the submultiple harmonic thereof which is the desired reference pulse repetition frequency. The output of multivibrator 14, consisting of a series of pulses of voltage at the reference pulse repetition frequency, each pulse being of greater duration than the calibration pulse repetition interval, is applied in combination with the series of pulses produced in the output of blocking oscillator 13 to electronic triggering circuits 15 which cause one cycle delay multivibrators 16 and 17 to simultaneously operate immediately after a calibration pulse and at the trigger repetition frequency. The outputs of multivibrators 16 and 17 each consist of a series of pulses at the trigger repetition frequency and their pulse durations may be controlled by means of zero adjustment control 18 and range control 19 respectively.

The series of controllable duration pulses from multivibrator 16 is coupled through a differentiating circuit 20 and a buffer amplifier 21 which produce at terminal 24, from the trailing edges of the above series of controllable duration pulses, a series of reference pulses of voltage at the desired repetition frequency whose phase relationship with the series of calibration pulses may be adjusted as desired by means of zero adjustment control 18.

The series of controllable duration pulses produced by delay multivibration 17 is coupled to a gating amplifier 22, producing in its output a series of gating pulses of voltage of similar frequency and duration which is applied to buffer amplifier 23 in such a manner as to exclude the production at terminal 25 of any known and desired number of calibration pulses of voltage after the production at terminal 24 of each reference pulse of voltage. This constitutes the gating above-mentioned.

Figure 3:
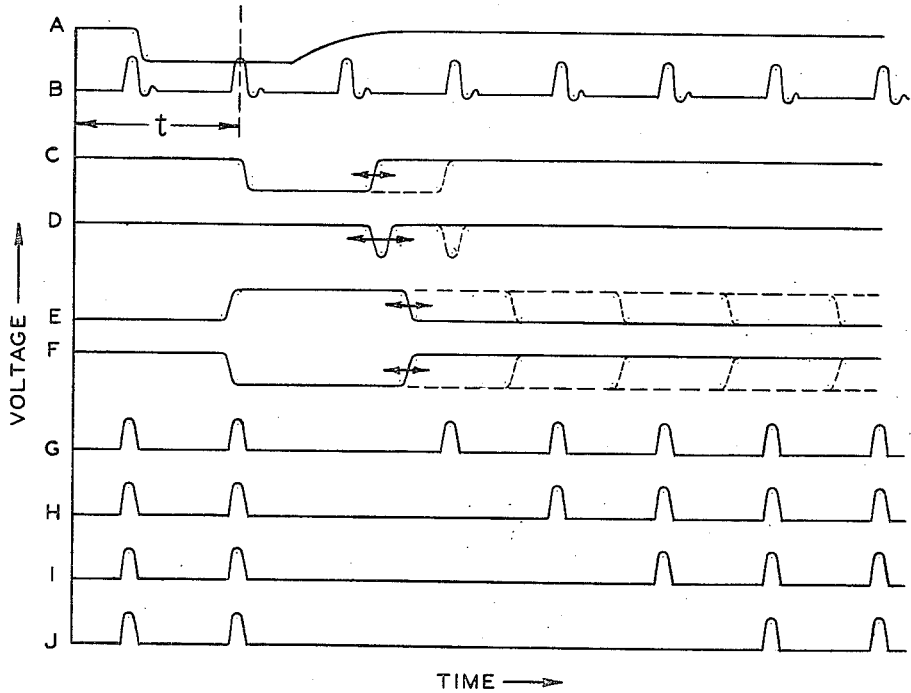
Fig. 3 represents certain wave forms of electric voltage which will be produced by various components of the embodiment of Fig. 1.

Reference is next made to Figs. 2 and 3 for a more detailed explanation of the operation and description of the embodiment of Fig. 1.

In Fig. 2, blocking oscillator 13 is repetitively triggered, in the manner previously described, by crystal controlled oscillator 11 through frequency multiplying amplifier 12 producing, in its output circuit, a series of regularly spaced substantially positive pulses of voltage (Line B, Fig. 3) at the desired calibration repetition frequency. These pulses are coupled through resistance 75 to control grid 78 of pentode tube 76 which is connected as a cathode follower in buffer amplifier 23. The voltage applied to screen grid 77 of tube 76 is obtained from the plate 73 of gating amplifier tube 74 and is normally of high value, allowing tube 76 to conduct heavily during application of the above-mentioned pulses to control grid 78 and causing pulses of similar polarity and frequency to be produced across cathode resistance 79. The pulses of voltage appearing across resistance 79 are directly coupled to grid 80 of triode tube 81, which is connected as a second cathode follower in buffer amplifier 23 and is normally non-conducting by reason of positive cathode bias, causing pulses of voltage of similar polarity and frequency to be produced across second cathode resistance 82. The last mentioned pulses are coupled through condenser 83 to terminal 25, there appearing as a series of regularly spaced calibration pulses of voltage at the desired repetition frequency (Line G, Fig. 3 with the exclusion of pulses during gating intervals as will be hereinafter described).

Frequency dividing multivibrator 14 is a free-running multivibrator of conventional design and is synchronized to operate at the desired reference pulse repetition frequency, a submultiple of the calibration repetition frequency, by application through coupling condenser 26 of the calibration pulses (Line G, Fig. 3) to grid 28 of multivibrator tube 27. A series of negative voltage pulses (Line A, Fig. 3) at the reference pulse repetition frequency and of pulse duration greater than the calibration pulse repetition interval is produced at plate 29 of multivibrator tube 30 and are applied through coupling condenser 31 to cathodes 35 and 36 of triode triggering tubes 34 and 38, respectively, of triggering circuits 15. The series of positive pulses (Line B, Fig. 3) from blocking oscillator 13 are additionally applied through condenser 32 to the respective grids 33 and 37 of tubes 34 and 38 which are normally non-conducting by reason of the positive cathode bias, causing both tubes to simultaneously conduct upon coincidence of a positive and negative pulse (as at time "t," Fig. 3) and draw current through plate resistances 46 and 64 of delay multivibrators 16 and 17, respectively. A series of negative triggering pulses at the reference pulse repetition frequency in which each pulse occurs immediately after a blocking oscillator pulse will therefore be simultaneously produced at plates 45 and 63 of respective delay multivibrator tubes 44 and 62 due to the direct connection thereto.

In conventional delay multivibrators 16 and 17, triode tubes 50 and 66 are normally conducting by reason of the positive grid-to-cathode bias supplied and triode tubes 44 and 62 are normally non-conducting by reason of the positive cathode-to-grid bias developed by the conduction of tubes 50 and 66 through common cathode resistances 48 and 65 respectively. The previously described series of negative triggering pulses are coupled by means of condensers 47 and 69 to grids 49 and 67 of normally conducting multivibrator tubes 50 and 66, respectively, each pulse of the series simultaneously causing conventional one cycle switching action of multivibrators 16 and 17. This switching action of multivibrators 16 and 17 will cause a series of negative pulses of voltage (one is shown in Line C, Fig. 3) to be produced at plate 45 of tube 44 of multivibrator 16 and a series of positive pulses of voltage (one is shown in Line E, Fig. 3) to be produced at plate 68 of tube 66 of multivibrator 17, both series of pulses being at the reference pulse repetition frequency with each pulse beginning immediately after a blocking oscillator pulse (time "t," Fig. 3). Zero adjustment control 18, consisting of voltage divider resistances 39, 40 and 42, and sliding contact 41 and range control 19 consisting of voltage divider resistances 57, 58 and 59, and sliding contact 60 provide means for controlling the fixed positive grid bias of multivibrator tubes 44 and 62 and consequent pulse duration of the above-described negative (Line C, Fig. 3) and positive (Line E, Fig. 3) pulses produced by multivibrators 16 and 17, respectively.

The controllable duration negative pulses of voltage (as in Line C, Fig. 3) produced by multivibrator 16 are passed through a differentiating circuit 20, consisting of resistance 52 and condenser 51, to buffer amplifier 21. Differentiating circuit 20 produces negative and positive pips of voltage on grid 54 of buffer amplifier tube 53 from the respective leading and trailing edges of the applied controllable length negative pulses. Tube 53 is so biased as to be unaffected by negative pips of voltage applied to grid 54 but will conduct heavily upon the application of the above described positive pips of voltage to grid 54. A series of negative pulses will consequently be produced at plate 55 of buffer amplifier tube 53 which are coupled through condenser 56 to terminal 24, there appearing as a series of reference pulses of voltage (one is shown in Line D, Fig. 3) at the desired repetition frequency whose phase relationship to the series of calibration pulses (Line G, Fig. 3) may be controlled by means of zero adjustment control 18.

The controllable duration positive pulses of voltage (as in Line E, Fig. 3) produced by multivibrator 17 are applied through condenser 71 to grid 72 of conventional gating amplifier tube 74. Tube 74 is normally non-conducting by reason of the conventional grid clamping action of condenser 71, resistance 70, and its grid-to-cathode resistance but conducts heavily during each applied controllable duration positive pulse (as in Line E, Fig. 3) producing a series of negative gating pulses (one is shown in Line F, Fig. 3) of similar duration and repetition frequency at plate 73. As previously described, the voltage to screen grid 77 of conventional buffer amplifier tube 76 is supplied from the same source supplying plate 73 of tube 74, and passage of blocking oscillator pulses (Line B, Fig. 3) through buffer amplifier tube 76 to grid 80 of tube 81 will be attenuated during the negative gating pulses (Line F, Fig. 3). Tube 81 is sufficiently biased below cut-off to completely prevent passage therethrough to terminal 25 of any attenuated blocking oscillator pulses passed by tube 76 during the gating interval. Any desired number of calibration pulses at terminal 25 may therefore be excluded after each reference pulse produced at terminal 24 as illustrated in Lines G, H, I, and J of Fig. 3 for various settings of range control 19.

It is recognized that, to those skilled in the art, there will be apparent various modifications and arrangements which may be made without departing from the spirit and scope of the principles entailed.

The invention is only to be limited by the appended claims.

What is claimed is:

1. An ultra high frequency calibrator for the generation of a series of regularly spaced calibration pulses of voltage at a known and desired repetition frequency and a series of regularly spaced reference pulses of voltage at a known and desired sub-multiple of said calibration repetition frequently comprising, a blocking oscillator, means for producing a series of regularly spaced pulses of voltage at said calibration pulse repetition frequency in the output of said blocking oscillator, means for producing from said output of said blocking oscillator said series of regularly spaced calibration pulses of voltage, a frequency dividing multivibrator responsive to said series of regularly spaced calibration pulses of voltage for producing in its output a series of regularly spaced pulses of voltage at said reference pulse repetition frequency, means responsive to said output of said frequency dividing multivibrator for producing said series of regularly spaced reference pulses of voltage, and means for abstracting said series of calibration pulses of voltage and said series of reference pulses of voltage.

2. In combination with claim 1, means for controlling the phase relationship of said series of regularly spaced reference pulses of voltage with reference to said series of regularly spaced calibration pulses of voltage, and means for excluding any known and desired number of said calibration pulses of voltage first produced after each said reference pulse of voltage from said output of said calibrator.

3. An ultra high frequency calibrator for the generation of a series of regularly spaced calibration pulses of voltage at a known and desired repetition frequency and a series of regularly spaced reference pulses of voltage at a known and desired submultiple of said calibration repetition frequency comprising, a crystal controlled oscillator producing in its output a frequency which is a submultiple harmonic of said calibration pulse repetition frequency, a frequency multiplier amplifier coupled to said output of said crystal controlled oscillator and tuned to a multiple harmonic thereof producing in its output a frequency which is equal to said calibration pulse repetition frequency, a blocking oscillator coupled to and synchronized by said output from said frequency multiplying amplifier for producing in its output a first series of regularly spaced pulses of voltage of like repetition frequency, a first buffer amplifier responsive to said first series of pulses for producing in its output said series of calibration pulses of voltage, a frequency dividing multivibrator responsive to said series of calibration pulses for producing in its output a second series of regularly spaced pulses of voltage at said reference pulse repetition frequency, each of said second series of pulses being of greater duration than the repetition interval of said first series of pulses, a first electron triggering circuit responsive to said first and second series of pulses and caused by the coincidence of pulses thereof to produce in its output a first series of triggering pulses of voltage at said reference pulse repetition frequency, a first one cycle delay multivibrator responsive to said first series of triggering pulses for producing in its output a third series of pulses of voltage at said reference pulse repetition frequency, means for controlling the duration of each pulse of said third series, a differentiating circuit and a second buffer amplifier responsive to said third series of pulses and caused by the trailing pulse edges thereof to produce in its output said series of reference pulses of voltage, said phase relationship of said series of reference pulses to said series of calibration pulses being controllable by said means for controlling the pulse duration of said third series of pulses and means for abstracting said series of reference pulses and said series of calibration pulses.

4. In combination with claim 3, a second electron triggering circuit responsive to said first and second series of pulses and caused by the coincidence of pulses thereof to produce in its output a second series of triggering pulses of voltage at said reference pulse repetition frequency, a second one cycle delay multivibrator responsive to said second series of triggering pulses for producing in its output a fourth series of pulses of voltage at said reference pulse repetition frequency, means for controlling the duration of each pulse of said fourth series of pulses, a gating amplifier responsive to said fourth series of pulses for producing in its output a series of gating pulses of voltage of similar duration and frequency, and means for applying said gating pulses to said first buffer amplifier in such a manner as to block its operation for the duration of each of said gating pulses, whereby any known and desired number of said calibration pulses of voltage first produced after each said reference pulse of voltage may be excluded from said output of said first buffer amplifier.

5. An ultra high frequency calibrator comprising, a generator of signals of a continuous constant frequency, means under control of said constant frequency signals for producing a first series of pulses having a frequency of recurrence which is equal to said constant frequency, means for producing under control of the pulses of said first series a second series of pulses having a frequency of recurrence which is a submultiple of that of said first series, means under control of said first and second series for producing a third series of pulses having a frequency of recurrence equal to that of said second series, means under control of said third series of pulses for producing a fourth series of pulses having a frequency of recurrence equal to that of said third series and whose phase relationship to said first series may be varied, and means for abstracting said first and fourth series of pulses.

6. An ultra high frequency calibrator comprising means for generating signals at a continuous constant frequency, means under control of said constant frequency signals for producing a first series of similar pulses having a frequency of recurrence equal to said constant frequency, means under control of said first series of pulses for producing a second series of pulses having a frequency of recurrence which is a submultiple of that of said first series of pulses, means under control of said first and second series of pulses for producing a third series of pulses of controllable duration having a frequency of recurrence equal to that of said second series, means for producing under control of said third series of pulses a fourth series of pulses having a frequency of recurrence which is equal to that of said third series of pulses and whose phase relationship to said first series of pulse is controllable, means under control of said first and second series of pulses for excluding from the output of said calibrator any known and desired number of said first series of pulses first produced after each pulse of said fourth series of pulses.

7. In an ultra high frequency calibrator, means for generating a first series of pulses at a first repetition rate, means responsive to said first series of pulses for producing a second series of pulses at a second repetition rate which is a submultiple of said first repetition rate, means responsive to said first and second series of pulses for periodically producing a gate at said second pulse repetition rate, said gate producing means including means for varying the duration of said gate, and means responsive to said first series of pulses and said gate for blocking pulses of said first series occurring during said gate and passing the pulses of said first series not occurring during said gate.

References Cited in the file of this patent

UNITED STATES PATENTS

| Number | Name | Date |
| --- | --- | --- |
| 2,408,078 | Labin et al. | Sept. 24, 1946 |
| 2,414,477 | Meacham | Jan. 21, 1947 |
| 2,432,516 | Doba | Dec. 16, 1947 |